No. 836,331. PATENTED NOV. 20, 1906.
J. MUIR.
AXLE BLOCK FOR VEHICLES.
APPLICATION FILED MAR. 10, 1903.
2 SHEETS—SHEET 1.
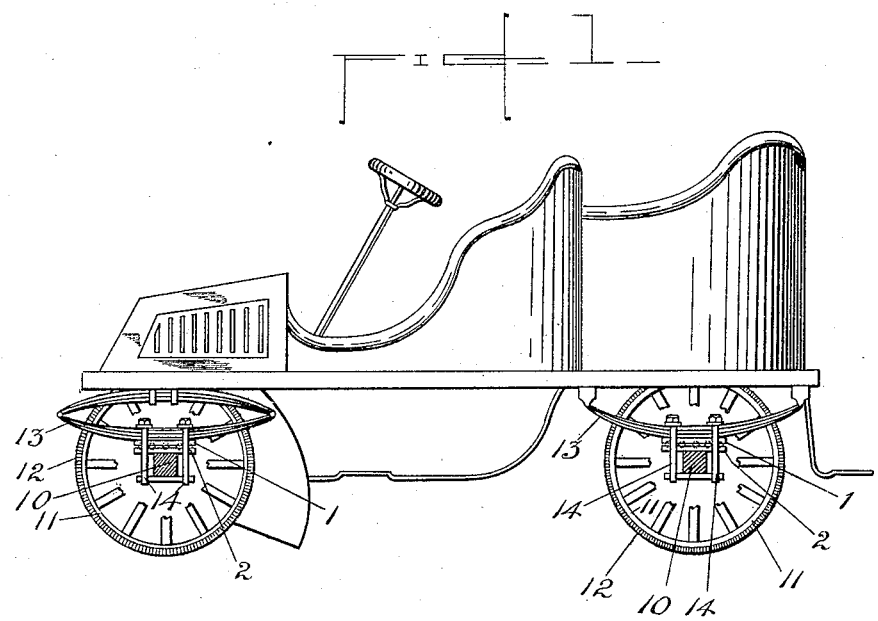
WITNESSES:
INVENTOR
John Muir
BY
ATTORNEYS No. 836,331. PATENTED NOV. 20, 1906.
J. MUIR.
AXLE BLOCK FOR VEHICLES.
APPLICATION FILED MAR. 10, 1903.
2 SHEETS—SHEET 2.
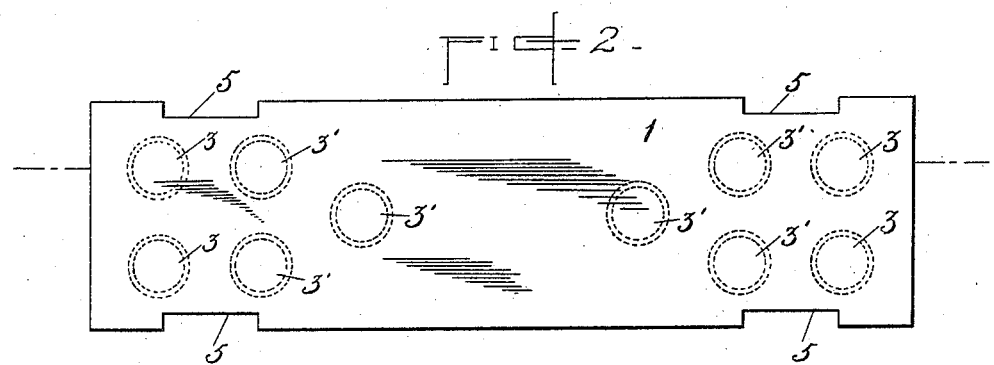
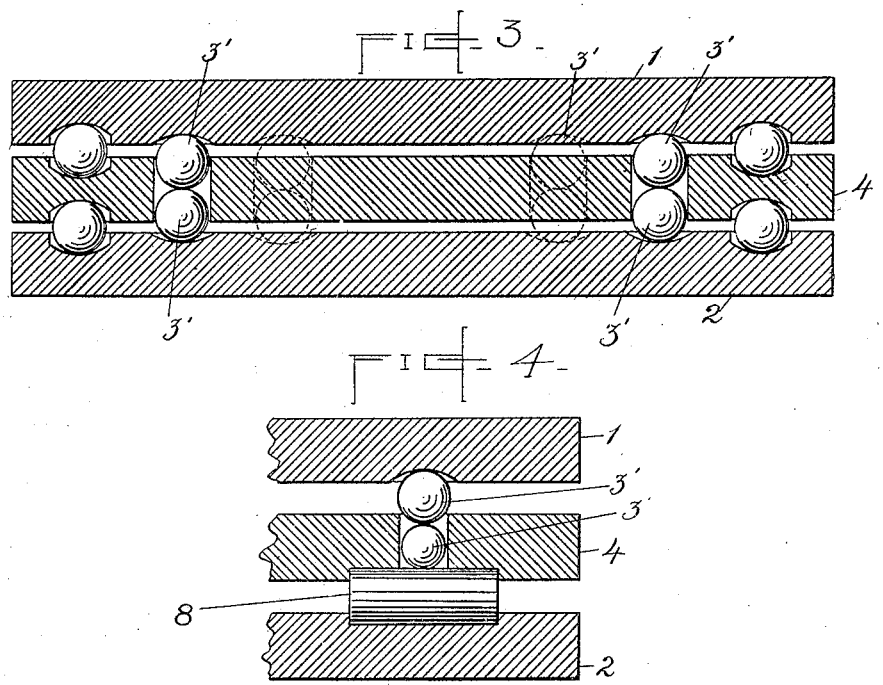
WITNESSES:
C. H. Tischner Jr.
E. L. Lawler
INVENTOR
John Muir
BY
Townsend & Decker
ATTORNEYS

UNITED STATES PATENT OFFICE.

JOHN MUIR, OF BEITH, SCOTLAND.

AXLE-BLOCK FOR VEHICLES.

No. 836,331.　　　　Specification of Letters Patent.　　　　Patented Nov. 20, 1906.

Application filed March 10, 1903. Serial No. 147,111.

*To all whom it may concern:*

Be it known that I, JOHN MUIR, a subject of the King of England, and a resident of Main's House, Beith, Scotland, have invented certain new and useful Improvements in Axle-Blocks for Vehicles, of which the following is a specification.

My invention relates to an improved means for sustaining the body of a carriage upon its axle, and has for its object to prevent the transmission of sudden shock or vibration to the body of the vehicle from impact of the tire with the roadway while the vehicle is in motion.

My invention is designed especially for use with automobiles employing rigid tires in place of pneumatic or cushion tires.

My invention consists in a novel support for vehicle-bodies comprising, essentially, superimposed balls or their equivalents retained in position by suitable plates or blocks and adapted to carry the weight of their vehicle-body at the rolling-point of engagement with one another. Said support may be interposed at any point between the body of the vehicle and the roadway. By thus sustaining or supporting the vehicle-body I find in practice that sudden shock or vibrations which tend to communicate themselves over the tires or rims of the wheels to the body of the vehicle are dissipated or dispersed and that the sensation of persons riding in said vehicle over an ordinary roadway, although the tires of the vehicle are of substantially rigid material, is as if said tires were cushion or elastic tires and that the disagreeable vibrations which ordinarily are felt when rigid tires are employed are substantially absent.

In carrying out my invention I propose to embody the rocking or rolling points of contact in the axle-block which rests upon the axle directly and to which in ordinary practice the carriage-spring is fastened.

The rolling or rocking points of contact may be afforded by balls, rollers, or other similar devices adapted to furnish small points of contact on which the weight of the superstructure is sustained and to afford a point of rocking or rolling support by means of which, as I have demonstrated, the vibrations may be effectually reduced or dissipated and prevented from being communicated through the axle-block to the occupants of the vehicle.

The axle-block itself is secured by straps or otherwise directly to the axle of the vehicle in the ordinary way, the body-sustaining spring of the vehicle being mounted upon and being secured to the axle-block by the usual clips or clamps or in any other suitable manner.

In the accompanying drawings, Figure 1 is a side elevation of a vehicle equipped in accordance with my invention, the axle being shown in vertical section at the point of application of the axle-block and carriage-spring and the hub of the wheels being broken away. Fig. 2 is a plan of one of the axle-blocks, the location of some of the balls being shown by the dotted lines. Fig. 3 is a longitudinal vertical section through the axle-block in one of its forms on the line of a row of balls. Fig. 4 shows in the same manner a modification in the construction of the block or bearing.

In the drawings, 10 indicates the vehicle-axle, and 11 the wheel furnished at its rim with a tire 12, which may be rigid or semi-rigid, like, for instance, the improved pigskin tires devised by me.

1 indicates the upper section or plate of the axle-block, and 2 the lower section or portion of the same, the latter being applied directly to the axle, while upon the top of the former a carriage-spring 13 rests.

14 indicates the axle clips or clamps which bind the spring to the block and hold the block to the axle in the usual manner. The usual notches in the side of the axle-block to receive the clips or clamps are indicated at 5 in Fig. 2.

The balls are indicated by the numeral 3'. The balls are by preference superposed directly upon one another, so as to give a multiplicity of points of rolling or rocking contact in a vertical line between the upper and lower plates. By this means great freedom of action is obtained and shocks of vibration are perfectly dissipated. To maintain the vertical position and true alinement of said balls 3' and to also aid in absorbing shock, a central plate 4 may be used, said plate being provided with suitable perforations or holes which embrace the balls 3', as shown, and hold them in position. The balls 3' may rest in hemispherical or other shaped cavities or depressions formed in the plates 1 2 and have rolling or rocking points of contact with said plates at the bottom of said recesses. The bottoms of the recesses or cavities are preferably of larger curvature than the sphere of the balls themselves and assist in maintaining the balls in position and bringing them back to normal position after they have been displaced or caused to rock or roll by any vibration or shock communicated to one or the other of the plates 1 2. The middle block or plate 4 may be held in its position by the balls 3, which work in cavities or depressions formed in the plates 1 2, as shown, and may be of any convenient shape adapted to allow rocking or rolling movement of said balls in any direction, but of such shape nevertheless that by the weight of the superimposed structure the balls will tend to seek the bottom or lowest points of said cavities.

While I have described the use of balls, it is possible to employ rollers and yet to obtain the perfect mobility of the parts in all directions by a rocking on similar points of contact. Thus, for instance, as indicated in Fig. 4, rollers 8 may be interposed between the plates 2 and 4 to permit a rocking or rolling movement in one direction, and balls 3' may be interposed between said roller and the upper plate 1, as shown, said balls having rolling contact with one another and with the plate 1 and roller 8, as shown. Both the balls 3' may be guided or centered in the openings in the plate 4, as indicated.

I do not limit myself to the use of any particular form of interposed rocking or rolling piece of metal, although I prefer to use balls, as described, since the essence of my invention consists in the provision of a number of rocking or rolling points of contact interposed in the structure of the vehicle, preferably embodied in the axle-block and of such character or construction as to allow perfect freedom of movement in all directions laterally, although to a limited extent.

I do not limit myself to the using of any particular number of balls 3' in the same vertical line nor to the use of any particular number of intermediate plates 4 and balls between the bottom and top plates 1 2.

What I claim as my invention is—

1. A bearing or support for vehicles comprising superimposed plates or blocks separated by superimposed balls which carry the weight of the vehicle-body at their rolling-point of engagement with one another.

2. An antivibration bed-plate or foundation comprising an upper and a lower plate or block, an intermediate plate, balls separating the upper and lower and impinging in one another vertically in openings in the intermediate plate, and balls seated in sockets or recessed bearings between the intermediate plate and said upper and lower plates for maintaining the said impinging balls in vertical alinement.

Signed at New York city, in the county of New York and State of New York, this 6th day of March, A. D. 1903.

JOHN MUIR.

Witnesses:
J. GALLWITZ,
E. L. LAWLER.